United States Patent
Yoneda et al.

(10) Patent No.: US 8,809,474 B2
(45) Date of Patent: Aug. 19, 2014

(54) CARBOXYL GROUP-CONTAINING POLYMER COMPOSITION

(75) Inventors: Atsuro Yoneda, Osaka (JP); Akiko Hemmi, Osaka (JP); Brian Joseph Loughnane, Fairfield, OH (US)

(73) Assignee: Nippon Shokubai Co., Ltd., Osaka (JP)

( * ) Notice: Subject to any disclaimer, the term of this patent is extended or adjusted under 35 U.S.C. 154(b) by 33 days.

(21) Appl. No.: 13/600,312

(22) Filed: Aug. 31, 2012

(65) Prior Publication Data

US 2014/0066583 A1    Mar. 6, 2014

(51) Int. Cl.
| | | |
|---|---|---|
| *C08F 28/02* | (2006.01) | |
| *C08F 220/06* | (2006.01) | |
| *C08F 220/18* | (2006.01) | |
| *C08F 220/16* | (2006.01) | |

(52) U.S. Cl.
CPC ............... *C08F 28/02* (2013.01); *C08F 220/18* (2013.01); *C08F 220/16* (2013.01)
USPC .......................... 526/287; 526/317.1; 526/319

(58) Field of Classification Search
CPC ....... C08F 28/02; C08F 220/06; C08F 220/18
USPC ...................... 526/317.1, 319, 287
See application file for complete search history.

(56) References Cited

FOREIGN PATENT DOCUMENTS

| | | |
|---|---|---|
| JP | 2002-003536 A | 1/2002 |
| JP | 2009-028618 A | 2/2009 |

*Primary Examiner* — Michael M Bernshteyn
(74) *Attorney, Agent, or Firm* — Novak Druce Connolly Bove + Quigg LLP

(57) ABSTRACT

The present invention provides a carboxyl group-containing polymer composition that exhibits excellent anti-soil redeposition ability in fabric washing. The carboxyl group-containing polymer composition contains a carboxyl group-containing polymer, which includes specific ratios of a structure unit (a) derived from an acrylic acid-based monomer (A) and a structure unit (b) derived from a sulfonic acid group-containing monomer (B) and has a specific weight average molecular weight, and a specific amount of an adduct of a hydrogen sulfite to the acrylic acid-based monomer (A).

7 Claims, No Drawings

CARBOXYL GROUP-CONTAINING POLYMER COMPOSITION

TECHNICAL FIELD

The present invention, relates to a carboxyl group-containing polymer composition. Specifically, the present invention relates to a carboxyl group-containing polymer composition useful as a raw material for detergent additives and the like.

BACKGROUND ART

Carboxyl group-containing polymers contained in carboxyl group-containing polymer compositions are useful polymers used in various industrial fields and are useful specifically for use in aqueous environment (e.g. dispersants, detergent compositions).

An example of conventional carboxyl group-containing polymers is a (meth)acrylic acid-based copolymer that includes 70 to 95 mol % of a structure unit (a) derived from a (meth)acrylic acid-based monomer (A) and 5 to 30 mol % of a structure unit (b1) derived from a (meth)allyl ether monomer (B1) and is terminated with a sulfonic acid group at one or both ends of its main chain (Patent Literature 1). Patent Literature 1 states that this (meth)acrylic acid-based copolymer exhibits excellent chelating ability, dispersibility, and gel resistance.

Another example is a scale inhibitor that contains a (meth)acrylic acid-based polymer including a structure unit (a) derived from a (meth)acrylic acid-based monomer (A), a structure unit (b) derived from a sulfonic acid-based monomer (B), and a structure unit (c) derived from another (meth)acrylic acid-based monomer (C) (Patent Literature 2). Patent Literature 2 states that this scale inhibitor containing a (meth)acrylic acid-based polymer has an excellent capacity to inhibit scale of calcium phosphate.

CITATION LIST

Patent Literature

Patent Literature 1: JP-A 2002-3536
Patent Literature 2: JP-A 2009-28618

SUMMARY OF INVENTION

Technical Problem

As described above, carboxyl group-containing polymers of various structures are under examination.

Currently, there is a water saving trend in fabric washing (e.g. use of used water in bathtub for fabric washing) with a recent growing concern of consumers for environmental problems. The use of used water in bathtub for fabric washing has disadvantages such as attachment or soil components in the water to fibers in fabric washing, and condensed hardening components in the water as a result of heating the water several times. Therefore, much higher performance than before is required to prevent soil components from reattaching to fibers (referred to as anti-soil redeposition ability) in fabric washing using harder water.

However, not all conventional carboxyl group-containing polymers and compositions containing these polymers meet the recent demanding need, that is, high performance in aqueous environment enough, and therefore further improvements are required to provide polymers and compositions that meet the recent need and are suitably used as higher-performance detergent additives.

The present invention has been made in view of this problem and an object of the present invention is to provide a composition containing a carboxyl group-containing polymer which exhibits excellent anti-soil redeposition ability in fabric washing.

Solution to Problem

The present inventors examined compositions that can be suitably used as detergent additives and the like and found that a composition that contains a carboxyl group-containing polymer including specific ratios of a structure unit derived from an acrylic acid-based monomer and a structure unit derived from a sulfonic acid group-containing monomer exhibits notable anti-soil redeposition ability even in hard water. Additionally, such a composition was found to be preeminent in this performance when it contains a specific level of an adduct of a hydrogen sulfite to the acrylic acid-based monomer (A), and thus found to be suited as a detergent additive which meets the recent need. Thus, the present inventors found a way to solve the above problem and therefore completed the present invention.

Specifically, the present invention provides a carboxyl group-containing polymer composition containing a carboxyl group-containing polymer. The carboxyl group-containing polymer includes a structure unit (a) derived from an acrylic acid-based monomer (A) at a level of from 60 to 70% by mass and a structure unit (b) derived from a sulfonic acid group-containing monomer (B) at a level of from 30 to 40% by mass based on 100% by mass of all structure units derived from all monomers in the carboxyl group-containing polymer, and has a weight average molecular weight of 23,000 to 50,000. The carboxyl group-containing polymer composition further contains an adduct of a hydrogen sulfite to the acrylic acid-based monomer (A), and the adduct is present at a level of 0.3 to 5% by mass based on 100% by mass of the solids content of the carboxyl group-containing polymer composition.

The following description is offered to describe the present invention in detail.

It should be understood that combinations of two or more of preferable modifications of the present invention described herein are also preferable modifications of the present invention.

[Carboxyl Group-Containing Polymer]

The carboxyl group-containing polymer composition of the present invention is a composition that contains a carboxyl group-containing polymer. First, the carboxyl group-containing polymer is described.

The carboxyl group-containing polymer (hereinafter, also simply referred to as "polymer") includes a structure unit (a) at a level of from 60 to 70% by mass and a structure unit (b) at a level of from 30 to 40% by mass based on 100% by mass of all structure units derived from all monomers in the carboxyl group-containing polymer (hereinafter, also simply referred to as "all the structure units"). The structure unit (a) is derived from an acrylic acid-based monomer (A), and the structure unit (b) is derived from a sulfonic acid group-containing monomer (B). The weight average molecular weight of the carboxyl group-containing polymer is 23,000 to 50,000.

<Acrylic Acid-Based Monomer (A)>

The carboxyl group-containing polymer herein is a polymer essentially including the structure unit (a) derived from an acrylic acid-based monomer (A) (hereinafter, also simply referred to as monomer (A)).

Examples of the acrylic acid-based monomer (A) include monomers represented by the formula (1):

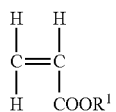
(1)

wherein $R^1$ represents a hydrogen atom, a metal atom, an ammonium group, or an organic amine group.

Examples of the structure unit (a) derived from an acrylic acid-based monomer (A) include a structure derived from a monomer (A) in which the carbon-carbon, double bond is converted to a single bond. Specific examples thereof are those represented by the formula (2):

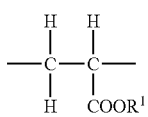
(2)

wherein $R^1$ is defined as above.

Due to the presence of the structure unit (a), the carboxyl group-containing polymer can act as a high-performance dispersant and exhibit notable anti-soil redeposition ability against hydrophobic soils.

When $R^1$ in the formulas (1) and (2) is a metal atom, an ammonium group, or an organic amine group, the acrylic acid-based monomer (A) is a metal salt, an ammonium salt, or an organic amine salt of acrylic acid.

Examples of metal atoms for $R^1$ in the formulas (1) and (2) include alkali metal atoms such as lithium, sodium, and potassium; and alkaline earth metal atoms such as magnesium and calcium; and aluminum and iron.

Examples of organic amines for $R^1$ include alkanolamines such as monoethanolamine, diethanolamine, and triethanolamine; alkylamines such as monoethylamine, diethylamine, and triethylamine; and polyamines such as ethylenediamine and triethylenediamine.

$R^1$ is preferably a hydrogen atom, an alkali metal, or an ammonium group because they have a greater effect of improving the anti-soil redeposition ability of the polymer. $R^1$ is more preferably a hydrogen atom, sodium, potassium, or an ammonium group, and still more preferably a hydrogen atom or sodium.

Specific examples of the acrylic acid-based monomer (A) include acrylic acid and salts thereof. The acrylic acid-based monomer (A) is preferably acrylic acid or the sodium salt thereof.

The wording "the carboxyl group-containing polymer of the present invention contains a structure unit (a) derived from an acrylic acid-based monomer (A)" means that the prepared polymer contains a structure unit represented by the formula (2). Specifically, the "structure unit (a) derived from an acrylic acid-based monomer (A)" herein is intended to include structure units introduced in a step before a polymerization reaction and structure units introduced in a step after a polymerization reaction, and refers to, for example, a structure unit that is incorporated in the polymer by synthesizing the acrylic acid-based monomer (A), and then copolymerizing the acrylic acid-based monomer (A) with another monomer, or a structure unit that is completed by forming the main chain of the carboxyl group-containing polymer by copolymerization, and then introducing a side chain of a specific structure thereto.

The carboxyl group-containing polymer of the present invention may include only one structure unit (a) or may include two or more structure units (a).

The structure unit (a) is contained at a level of 60 to 70% by mass based on 100% by mass of all the structure units derived from ail the monomers in the carboxyl group-containing polymer (i.e. the total amount of the structure unit (a), and structure units (b) and (a) described below). The polymer which includes the structure unit (a) at a level within this range is capable of successfully interacting with soil components when the composition of the present invention which contains the polymer is used as a detergent builder and the like. Therefore, the polymer can disperse soil particles by the interaction and exhibit anti-soil redeposition ability.

The level of the structure unit (a) is preferably 62 to 70% by mass, more preferably 64 to 70% by mass, and still more preferably 66 to 70% by mass.

In the present invention, when the mass ratio (% by mass) of the structure unit (a) to all the structure units derived from all the monomers in the carboxyl group-containing polymer is calculated, the structure unit (a) is treated as its corresponding acid. In the case of the structure unit —$CH_2$—CH (COONa)— derived from sodium acrylate, the mass ratio (% by mass) of the structure unit derived from the corresponding acid (acrylic acid), that is, the mass ratio (% by mass) of the structure unit —$CH_2$—CH(COOH)— is calculated. Likewise, when the mass ratio (% by mess) of the acrylic acid-based monomer (A) to all the monomers is calculated, the acrylic acid-based monomer (A) is treated as its corresponding acid. For example, to determine the mass ratio of sodium acrylate, the mass ratio (% by mass) of the corresponding acid (acrylic acid) is calculated instead.

The method for preparing the acrylic acid-based monomer (A) is not particularly limited.

<Sulfonic Acid Group-Containing Monomer (B)>

The carboxyl group-containing polymer herein is a polymer essentially including a structure unit (b) derived from a sulfonic acid group-containing monomer (B) (hereinafter, also referred to as monomer (B)) as well.

Examples of the sulfonic acid group-containing monomer (B) include monomers represented by the formula (3):

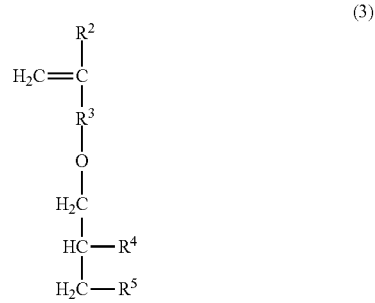
(3)

wherein $R^2$ represents a hydrogen atom or a methyl group; $R^3$ represents a $CH_2$ group, a $CH_2CH_2$ group, or a direct bond; $R^4$ and $R^5$ independently represent a hydroxyl group or —$SO_3Z$;

Z represents a hydrogen atom, a metal atom, an ammonium group, or an organic amine group; and at least one of $R^4$ and $R^5$ is —$SO_3Z$.

Examples of the structure unit (B) derived from a sulfonic acid group-containing monomer (B) include a structure derived from a monomer (B) in which the carbon-carbon double bond is converted to a single bond. Specific examples thereof are those represented by the formula (4):

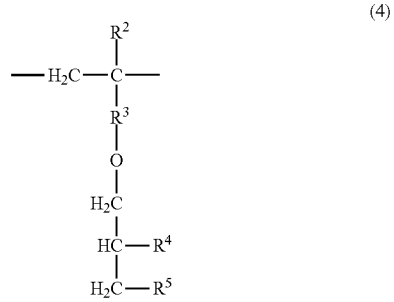

(4)

wherein $R^2$, $R^3$, $R^4$, and $R^5$ are all defined as above.

Due to the presence of the structure unit (b), the carboxyl group-containing polymer can act as a high-performance dispersant for tough soils, and exhibit notable anti-soil redeposition ability against hydrophobic soils.

$R^2$ in the formulas (3) and (4) represents a hydrogen atom or a methyl group, and is preferably a hydrogen atom.

$R^3$ represents a $CH_2$ group, a $CH_2CH_2$ group, or a direct bond, and is preferably a $CH_2$ group.

$R^4$ and $R^5$ independently represent a hydroxyl group or —$SO_3Z$, and at least one of $R^4$ and $R^5$ is —$SO_3Z$. In order to more successfully ensure the effect of the present invention enough, it is preferable that only one of $R^4$ and $R^5$ is —$SO_3Z$.

Z represents a hydrogen atom, a metal atom, an ammonium group, or an organic amine group.

In the case that Z is a metal atom, an ammonium group, or an organic amine group, —$SO_3Z$ is a metal salt, an ammonium salt, or an organic amine salt of sulfonic acid.

Examples of metal atoms and organic amines for Z include the same metal atoms and organic amines listed above for $R^1$. Z is preferably a hydrogen atom, an alkali metal atom, or an ammonium group, more preferably a hydrogen atom, sodium, or potassium, and still more preferably a hydrogen atom or sodium.

Specific examples of the sulfonic acid group-containing monomer (B) represented by the formula (3) include 3-(meth)allyloxy-2-hydroxypropanesulfonic acid, 3-(meth)allyloxy-1-hydroxypropanesulfonic acid, and salts of these. In order to more successfully ensure the effect of the present invention enough, 3-(meth)allyloxy-2-hydroxypropanesulfonic acid and salts thereof are preferably, and 3-allyloxy-2-hydroxypropanesulfonic acid and the sodium salt thereof are more preferable.

The wording "the carboxyl group-containing polymer of the present invention contains a structure unit (b) derived from a sulfonic acid group-containing monomer (B)" means that the prepared polymer contains a structure unit represented by the formula (4). Specifically, the "structure unit (b) derived from a sulfonic acid group-containing monomer (B)" herein is intended to include structure units introduced in a step before a polymerization reaction and structure units introduced in a step after a polymerization reaction, and refers to, for example, a structure unit that is incorporated in the polymer by synthesizing the sulfonic acid group-containing monomer (B), and then copolymerizing the sulfonic acid group-containing monomer (B) with another monomer, or a structure unit that is completed by forming the main chain of the carboxyl group-containing polymer by copolymerization, and then introducing a side chain of a specific structure thereto.

The carboxyl group-containing polymer of the present invention may include only one structure unit (b) or two or more structure units (b).

The structure unit (b) is contained at a level of 30 to 40% by mass based on 100% by mass of all the structure units derived from all the monomers in the carboxyl group-containing polymer (i.e. the total amount of the structure units (a) and (b) and structure unit (e) described below). The polymer which includes the structure unit (b) at a level within this range is capable of successfully interacting with soil components when the composition of the present invention containing the polymer is used as a detergent builder and the like. Therefore, the polymer can disperse soil particles by the interaction and exhibit anti-soil redeposition ability.

The level of the structure unit (b) is preferably 30 to 38% by mass, more preferably 30 to 36% by mass, and still more preferably 30 to 34% by mass.

In the present invention, when the mass ratio (% by mass) of the structure unit (b) to all the structure units derived from all the monomers in the carboxyl group-containing polymer is calculated, the structure unit (b) is treated as its corresponding acid. In the case of a structure unit derived from sodium 3-allyloxy-2-hydroxypropanesulfonate, the mass ratio (% by mass) of the structure unit derived from the corresponding acid (3-allyloxy-2-hydroxypropanesulfonic acid) is calculated. Likewise, when the mass ratio (% by mass) of the sulfonic acid group-containing monomer (B) to all the monomers is calculated, the sulfonic acid group-containing monomer (B) is treated as its corresponding acid. For example, to determine the mass ratio of sodium 3-allyloxy-2-hydroxypropanesulfonate, the mass ratio (% by mass) of the corresponding acid (3-allyloxy-2-hydroxypropanesulfonic acid) is calculated instead.

The method for preparing the sulfonic acid group-containing monomer (B) is not particularly limited, and any suitable method can be used for the preparation. For example, a method for adding a hydrogen sulfite to the glycidyl group of (meth)allylglycidyl ether is mentioned as an example of a simple method for the preparation.

<Other Monomers>

The carboxyl group-containing polymer of the present invention may include structure unit(s) (e) derived from other monomer(s) (E) (monomer(s) other than the acrylic acid-based monomer (A) and the sulfonic acid group-containing monomer (B)). The carboxyl group-containing polymer may contain only one structure unit (e) or two or more structure units (e).

The other monomer(s) (E) (hereinafter, also referred to as monomer(s) (E)) are not particularly limited, provided that they are copolymerizable with the monomers (A) and (B). Appropriate ones can be selected by considering desired effects.

Specific examples of other monomers (E) include carboxyl group-containing monomers other than the monomer (A) such as methacrylic acid, maleic acid, crotonic acid, itaconic acid, 2-methyleneglutaric acid, and salts of these; sulfonic acid group-containing monomers other than the monomer (B) such as vinylsulfonic acid, (meth)allylsulfonic acid, 1-acrylamido-1-propanesulfonic acid, styrenesulfonic acid, and salts of these; polyalkylene glycol chain-containing monomers such as monomers obtained by adding alkylene oxides to unsaturated alcohols (e.g. (meth)allylalcohol, isoprenol) and (meth)acrylic acid esters of alkoxyalkylene glycols; vinyl aromatic compound-based monomers having a heterocyclic aromatic hydrocarbon group such as vinyl pyridine and vinyl imidazole; amino group-containing monomers such as dialkylaminoalkyl (meth)acrylates (e.g. dimethylaminoethyl acrylate, dimethylaminoethyl methacrylate, dimethylaminopropyl acrylate), dialkylaminoalkyl (meth)acrylamides (e.g. dimethylaminoethyl acrylamide, dimethylaminoethyl methacrylamide, dimethylaminopropyl acrylamide), allylamines including diallylamine and diallylalkylamines (e.g. diallyldimethylamine), and quaternized compounds of these; N-vinyl monomers such as N-vinyl pyrrolidone, N-vinylformamide, N-vinylacetamide, N-vinyl-N-methylformamide, N-vinyl-N-methylacetamide, and N-vinyloxazolidone; amide-based monomers such as (meth)acrylamide, N,N-dimethylacrylamide, and N-isopcopylacrylamide; hydroxyl group-containing monomers such, as (meth)allylalcohol and isoprenol; alkyl (meth)acrylate-based monomers such as butyl(meth)acrylate, 2-ethylhexyl (meth)acrylate, and dodecyl (meth)acrylate; hydroxyalkyl (meth)acrylate-based monomers such as 2-hydroxyethyl (meth)acrylate, 2-hydroxypropyl (meth)acrylate, 2-hydroxybutyl (meth)acrylate, 4-hydroxybutyl (meth)acrylate, and 2-hydroxyhexyl (meth) acrylate; vinylaryl monomers such as styrene, indene, and vinylaniline; and isobutylene and vinyl acetate.

The quaternized compounds can be obtained by the reaction between the amino group-containing monomers and common quaternizing agents. Examples of the quaternizing agents include alkyl halides and dialkyl sulfates.

The structure units (e) derived from other monomers (E) refer to structure units derived from the monomers (E) in each of which the carbon-carbon double bond is converted to a single bond. The wording "the carboxyl group-containing polymer of the present invention contains structure unit(s) (e) derived from other monomer(s) (E)" means that the prepared polymer contains structure unit(s) in which the carbon-carbon double bond in the monomer(s) (E) is converted to a single bond.

The level of the structure unit(s) (e) derived from other monomer(s) (E), which are optional components, is preferably 0 to 10% by mass based on 100% by mass of all the structure units derived from all the monomers in the carboxyl group-containing polymer (i.e. the total amount of the structure units (a), (b), and (e)). The level is more preferably 0 to 5% by mass, and still more preferably 0% by mass.

In the case that the structure unit (e) is a structure unit derived from an amino group-containing monomer, the mass ratio of this structure unit to all the structure units derived from all the monomers and the mass ratio of the amino group-containing monomer to all the monomers are calculated by treating the structure unit and the monomer as the corresponding unneutralized amine. For example, in the case that the other monomer (E) is vinylamine hydrochloride, the mass ratio (% by mass) of its corresponding unneutralized amine, that is, the mass ratio of vinylamine is calculated instead.

The mass ratios (% by mass) of quaternized amino group-containing monomers and structure units derived from these are calculated without counting the mess of counteranions.

In the case that the structure unit (e) is a structure unit derived from an acid group-containing monomer, the mass ratio (% by mass) of the structure unit to all the structure units derived from all the monomers is calculated by treating the structure unit as its corresponding acid. The mass ratio (% by mass) of the acid group-containing monomer to all the monomers is also calculated by treating the monomer as its corresponding acid.

<Physical Properties of Carboxyl Group-Containing Polymer>

The carboxyl group-containing polymer of the present invention contains the structure units (a) and (b) at specific levels defined above, and optionally contains the structure unit(s) (e) at a specific level defined above. These structure units may be arranged in either a block or random fashion.

The weight average molecular weight of the carboxyl group-containing polymer is 23,000 to 50,000. If the weight average molecular weight is in this range, the anti-soil redeposition ability is improved. The weight average molecular weight is preferably 23,000 to 45,000, more preferably 24,000 to 40,000, still more preferably 25,000 to 38,000, and particularly preferably 27,000 to 33,000.

The weight average molecular weight used herein is determined by GPC (gel permeation chromatography) and can be determined with the device under the measurement conditions described in Examples below.

The carboxyl group-containing polymer of the present invention and the composition of the present invention have high anti-soil redeposition ability, and preferably have an anti-soil redeposition ratio of at least 37%. The anti-soil redeposition ratio is more preferably at least 38%, and still more preferably at least 40%.

The anti-soil redeposition ratio can be measured by the procedure described in Examples below.

[Method for Preparing Carboxyl Group-Containing Polymer]

The carboxyl group-containing polymer of the present invention can be prepared by copolymerizing monomer materials which essentially include specific amounts of an acrylic acid-based monomer (A) represented by the formula (1) and a sulfonic acid group-containing monomer (B) represented by the formula (3), and optionally include a specific amount of other monomer(s) (E).

In the method for preparing the carboxyl group-containing polymer of the present invention, the amounts of the respective monomers need in the polymerization are specifically as follows. The amount of the monomer (A) is 60 to 70% by mass, and the amount of the monomer (B) is 30 to 40% by mass based on 100% by mass of all the monomers (the monomers (A), (B), and (E)). The use of the monomer (A) in an amount of less than 60% by mass may result in reduced absorbability to hydrophilic soils, and therefore may result in reduced anti-soil redeposition ability and detergency against hydrophilic soils. The use of the monomer (B) in an amount of leas than 30% by mass may result in reduced detergency against tough soils.

The amounts of the monomers (A) and (B) are preferably 62 to 70% by mass and 30 to 33% by mass, respectively, more preferably 64 to 70% by mass and 30 to 36% by mass, respectively, and still more preferably 66 to 70% by mass and 30 to 34% by mass, respectively.

In addition, the monomer(s) (E) may be used in an amount of 0 to 10% by mass based on 100% by mass of all the monomers (the monomers (A), (B), and (E)). The amount is more preferably 0 to 5% by mass, and still more preferably 0% by mass.

The polymerization method to obtain the carboxyl group-containing polymer of the present invention is not particularly limited, and a common polymerization method or a modified method thereof can be used. Examples of polymerization methods include radical polymerization. Specific examples thereof include oil-in-water emulsion polymerization, water-in-oil emulsion polymerization, suspension polymerization, dispersion, polymerization, precipitation polymerization, solution polymerization, aqueous solution polymerization, and bulk polymerization. Among these polymerization methods, solution polymerization is preferable because it is a highly safe method and provides production (polymerization) cost savings.

In the case of solution polymerization, the monomers are polymerized in a solvent.

The solvent may be one consisting of an organic solvent but is preferably one containing water. The solvent preferably contains at least 50% by mass of water based on the total amount (100% by mass) of the solvent, and the amount of water is more preferably at least 80% by mass. In particular, 100% by mass of water is preferable. Examples of organic solvents that can be used alone or in combination with water include aqueous organic solvents such as lower alcohols (e.g. ethanol, isopropanol), amides (e.g. N,N-dimethylformamide), ethers (e.g. diethyl ether, dioxane), glycol, glycerin, and polyethylene glycols.

Only one solvent may be used alone, or two or more solvents may be used in combination.

The amount of the solvent is preferably 40 to 300 parts by mass, more preferably 45 to 200 parts by mass, and further more preferably 50 to 150 parts by mass per 100 parts by mass of all the monomers (the monomers (A), (B), and (E)). The use of the solvent in an amount of less than 40 parts by mass per 100 parts by mass of all the monomers may result in production of a polymer with a high molecular weight. The use of the solvent in an amount of more than 300 parts by mass per 100 parts by mass of all the monomers may result in a low concentration of the resulting polymer, and therefore a step for removing the solvent may be required in some cases.

A portion or all of the solvent is charged in a reaction vessel at an initial stage of the polymerization, and a remaining portion of the solvent may be added (dropwise) to the reaction system during the polymerization reaction. Alternatively, the monomers and agents such as a polymerization initiator may be dissolved in the solvent and this solution containing these components may be added (dropwise) to the reaction system.

The reaction by solution polymerization is not particularly limited and may be carried out in a common way. The reaction is typically carried out, for example, by charging the solvent in the reaction system, and adding dropwise solutions containing the monomers and a solution containing a polymerization initiator (hereinafter, also referred to as initiator). In such a case, the concentration of each solution to be added dropwise is not particularly limited, and may be appropriately determined.

For example, in the case that solutions containing the monomers and a solution containing an initiator are added dropwise to the solvent set in the reaction system, the monomer (A), the monomer (B), the monomer(s) (E) (if necessary), the initiator, and other additives (if necessary) may be dissolved in solvents, respectively, and the polymerization may be carried out by adding (dropwise) the solutions to the reaction system during the polymerization in an appropriate manner. In this case, a portion or all of the monomer (A) may be charged in the reaction system before the start of the polymerization.

<Polymerization Initiator>

In the preparation method, commonly used polymerization initiators may be used. Specifically, suitable examples thereof include persulfates such as sodium persulfate, potassium persulfate, and ammonium persulfate; azo compounds such as 2,2'-azobis(2-amidinopropane)hydrochloride, 4,4'-azobis-4-cyanovaleric acid, azobis isobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Persulfates and 2,2'-azobis(2-amidinopropane)hydrochloride are more preferable among these polymerization initiators. Any of these polymerization initiators may be used alone, or two or more of these may be used in combination.

<Chain Transfer Agent>

In the preparation method, a chain transfer agent may be used as a molecular weight controlling agent for the polymer. The use of a chain transfer agent advantageously prevents an increase in the molecular weight of the resulting polymer over a certain level and therefore results in more efficient production of a carboxyl group-containing polymer having low-molecular weight.

A hydrogen sulfite and/or a compound capable of producing a hydrogen sulfite is/are used as chain transfer agent(s) in the preparation method. In this case, it is preferable to use a polymerization initiator in addition to the hydrogen sulfite and/or the compound capable of producing a hydrogen sulfite. Additionally, a heavy metal ion may be used in combination as a reaction accelerator as described below.

If a hydrogen sulfite and/or a compound capable of producing a hydrogen sulfite is/are used as chain transfer agent(s), the resulting polymer is terminated with a sulfonic acid (salt) group at one or both ends of its main chain.

Examples of compounds capable of producing a hydrogen sulfite include pyrosulfurous acid (salts), dithionous acid (salts), and sulfurous acid (salts). Particularly, pyrosulfurous acid (salts) are preferable.

The salts are preferably salts with metal atoms, ammonium, and organic amines.

Examples of the metal atoms include monovalent alkali metal atoms such as lithium, sodium, and potassium; divalent alkaline earth metal atoms such as calcium and magnesium; and trivalent metal atoms such as aluminum and iron.

Examples of the organic amines include alkanolamines such as monoethanolamine, diethanolamine, and triethanolamine; and triethylamine.

Among hydrogen sulfites and the compounds capable of producing a hydrogen sulfite, hydrogen sulfites are preferable.

Examples of hydrogen sulfites include sodium hydrogen sulfite, potassium hydrogen sulfite, and ammonium hydrogen sulfite. Particularly, sodium hydrogen, sulfite is more preferable.

Specific examples of the compounds capable of producing a hydrogen sulfite include sodium pyrosulfite and potassium pyrosulfite; sodium dithionite and potassium dithionite; and sodium sulfite, potassium sulfite, and ammonium sodium sulfite. Particularly, sodium, pyrosulfite is more preferable.

Any of these hydrogen sulfites and compounds capable of producing a hydrogen sulfite may be used alone, or two or more of these may be used in combination.

In addition to a hydrogen sulfite and/or a compound capable of producing a hydrogen sulfite, any of the following compounds may also be used as a chain transfer agent. Examples of such chain transfer agents include thiol-based chain transfer agents such as mercaptoethanol, thioglycolic acid, 2-mercaptopropionic acid, 3-mercaptopropionic acid, octyl 3-mercaptopropionate, 2-mercaptoethansulfonic acid, and n-dodecyl mercaptan; halides such as carbon tetrachloride, methylene chloride, bromoform, and bromotrichloroethane; secondary alcohols such as isopropanol and glycerin; and lower oxides such as phosphorous acid, bypophosphorous acid, and salts of these (e.g. sodium hypophosphite, potassium hypophosphite). Any of these chain transfer agents may be used alone, or two or more of these may be used in combination.

<Reaction Accelerator>

In the preparation method, a reaction accelerator may be added to reduce the amount of agents used in the reaction such as the polymerization initiator. Examples of reaction accelerators include heavy metal ions.

The term "heavy metal ions" used herein is intended to include metal ions having a specific gravity of not less than 4 g/cm$^3$. Preferred examples of heavy metals for the heavy metal ions include iron, cobalt, manganese, chromium, molybdenum, tungsten, copper, silver, gold, lead, platinum, iridium, osmium, palladium, rhodium, and ruthenium. Any of these heavy metals may be used alone, or two or more of these may be used in combination. Among these, iron is more preferable.

The ionic valency of the heavy metal ions is not particularly limited. For example, when iron is used as a heavy metal, the reaction accelerator may include iron ion in the Fe$^{2+}$ form, or Fe$^{3+}$ form, or may include iron ion in both forms.

These heavy metal ions may be used in any forms, provided that they are present in ion forms. For handleability, these heavy metal ions are preferably used in solution forms obtained by dissolving heavy metal compounds. The heavy metal compounds are any compounds, provided that they each contain a desired heavy metal that is to be captured in a polymerization initiator. Appropriate one can be selected according to a polymerization initiator used in combination.

When iron ion is used as a heavy metal ion, preferred examples of heavy metal compounds include Mohr's salt (Fe(NH$_4$)$_2$(SO$_4$)$_2$.6H$_2$O), ferrous sulfate heptahydrate, ferrous chloride, and ferric chloride. When manganese ion is used as a heavy metal ion, manganese chloride or the like is suitable. All of these are water-soluble compounds and therefore are used in aqueous solution forms and easy to handle. Solvents used to prepare a solution of a heavy metal compound are not limited to water, provided that they dissolve the heavy metal compound and do not inhibit the polymerization reaction in the preparation of the carboxyl group-containing polymer of the present invention.

A heavy metal ion may be added in any manner. Preferably, all of the heavy metal ion is added before the completion of addition of the monomers. More preferably, the heavy metal ion is charged all at once at the start of the reaction.

The amount of the heavy metal ion is preferably 0.1 to 10 ppm per the total amount of the polymerization reaction solution at the completion of the polymerization. If the amount of the heavy metal ion is less than 0.1 ppm, the effect by the heavy metal ion may not be provided enough. If the amount of the heavy metal ion is more than 10 ppm, the color tone of the resulting polymer may be deteriorated. Furthermore, polymers produced with excess heavy metal ions may cause colored soils when used as detergent builders.

The term "at the completion ex the polymerization" means the time when the polymerization reaction in the polymerization reaction solution substantially ends such that the desired polymer is provided. For example, in the case that the polymer produced in the polymerization reaction solution is neutralized, with an acid component, the amount of the heavy metal ion is determined based on the total amount of the polymerization reaction solution after the neutralization. In the case that two or more heavy metal ions are contained, the total amount of the heavy metal ions are within the above range.

In the preparation method, other compounds such as catalysts for decomposing the polymerization initiator and reducing compounds may be added in the reaction system upon the polymerization reaction in addition to the above-mentioned compounds.

Examples of catalysts for decomposing the polymerization initiator include halogenated metals such as lithium chloride and lithium bromide; metal oxides such as titanium oxide and silica dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, and benzoic acid, and esters and metal salts thereof; and heterocyclic amines such as pyridine, indole, imidazole, and carbazole, and derivatives thereof. Any of these decomposition catalysts may be used alone, or two or more of these may be used in combination.

Examples of reducing compounds include organic metal compounds such as ferrocene; inorganic compounds capable of generating metal ions (e.g. iron, copper, nickel, cobalt, manganese ions) such as iron naphthenate, copper naphthenate, nickel naphthenate, cobalt naphthenate, and manganese naphthenate; inorganic compounds such as ether adducts of boron trifluoride, potassium permanganate, and perchloric acid; sulfur-containing compounds such as sulfur dioxide, sulfuric acid esters, thiosulfuric acid salts, sulfoxylates, benzene sulfinic acid and substituted compounds thereof, and analogues of cyclic sulfinic acids such as p-toluene sulfinic acid; nitrogen-containing compounds such as hydrazine, β-hydroxyethylhydrazine, and hydroxylamine; aldehydes such as formaldehyde, propionaldehyde, n-butylaldehyde, isobutylaldehyde, and isovalerianaldehyde; and ascorbic acid. Any of these reducing compounds may be used alone, or two or more of these may be used in combination.

The combination of the chain transfer agent, the polymerization initiator, and the reaction accelerator is not particularly limited, and each of them can be suitably selected from the above examples. Either the polymerization initiator or the reaction accelerator may not be used. Preferred examples of the combination of the chain transfer agent, the polymerization initiator, and the reaction accelerator (written in this order) include sodium hydrogen sulfite/sodium persulfate/none, sodium hydrogen sulfite/none/Fe (ion), and sodium hydrogen sulfite/sodium persulfate/Fe (ion). The combinations of sodium, hydrogen sulfite/sodium persulfate/none and sodium hydrogen sulfite/sodium persulfate/Fe (ion) are more preferable, and the combination of sodium hydrogen sulfite/sodium persulfate/Fe (ion) is still more preferable. Here, "none" means that nothing is used as the corresponding agent.

<Amount of Polymerization Initiator and Other Agents>

The amount of the polymerization initiator is not particularly limited, provided that it is enough to initiate the copolymerization of the monomers. The amount of the polymerization initiator is preferably not more then 15 g per mol of all the monomers (the monomers (A), (B), and (E)), and more preferably 1 to 12 g.

When a persulfate is used as the polymerization initiator, the amount of the persulfate is preferably 1.0 to 5.0 g, and more preferably 2.0 to 4.0 g per mol of all the monomers. If the amount of the persulfate is less than 1.0 g, the resulting polymer tends to have a high molecular weight. On the other hand, addition of more than 5.0 g of the persulfate may not produce an effect proportional to the added amount and cause disadvantages such as low purity of the resulting polymer.

The method for adding the persulfate is not particularly limited, but it is preferable to almost continuously add the persulfate dropwise in an amount of at least 50% by mass of the predetermined required amount based on a consideration of its decomposability and the like. The amount is more preferably at least 80% by mass, and still more preferably 100% by mass (i.e. the persulfate is preferably all added dropwise). In the case that the persulfate is continuously added dropwise, the drop rate may be changed.

The drop-wise addition time is also not particularly limited. Since the persulfate is an initiator to be decomposed in a comparatively short time when the reaction is carried out under the suitable reaction conditions described below (e.g. temperature, pressure, pH), it is preferable to continue drop-wise addition of the persulfate until the completion of drop-wise addition of the monomers. It is more preferable to complete drop-wise addition of the persulfate within 30 minutes after the completion of drop-wise addition of the monomers, and is particularly preferable to complete the addition within 5 to 20 minutes after the completion of drop-wise addition of the monomers. Through such a process, the amount of residual monomers in the resulting polymer solution can be strikingly reduced.

Even if drop-wise addition of the initiator is completed before the completion of drop-wise addition of the monomers, the polymerization does not suffer from any disadvantages. The timing of the completion of drop-wise addition of the initiator can be determined according to the amount of residual monomers in the resulting polymer solution.

The starting timing of drop-wise addition of the polymerization initiator is not particularly limited and is appropriately determined. For example, drop-wise addition of the initiator may be started before drop-wise addition of the monomers. When two or more initiators are used in combination, a certain time after the start of drop-wise addition of one of the initiators or after the completion of drop-wise addition of this initiator, drop-wise addition of the other initiator(s) may be started. In each case, the starting timing of drop-wise addition of initiator(s) can be appropriately determined according to the decomposition speed of the initiator(s) and the reactivity of the monomers.

In the case that the polymerization initiator is added drop-wise, the concentration of the initiator solution is not particularly limited and is preferably 5 to 60% by mass, and more preferably 10 to 50% by mass. In the polymerization reaction, when initiator concentrations is less than 5% by mass, the initiator solution contains a solvent at a high concentration, resulting in low concentrations of the monomers. In this case, the polymeriziability of the monomers may be strikingly low, and a remarkably large portion of the monomers may remain in the resulting polymer solution. Such concentrations are disadvantageous in terms of cost because of low transportation efficiency and productivity. Concentrations of more than 60% by mass are disadvantageous in terms of safety and handleability upon drop-wise addition.

The amount of the chain transfer agent is not particularly limited, provided that it is determined such that the monomers (A), (B), and (E) are allowed to polymerize well. The amount of the chain transfer agent is preferably 1 to 20 g, and more preferably 2 to 15 g per mol of all the monomers (the monomers (A), (B), and (E)). If the amount of the chain transfer agent is less than 1 g, the molecular weight of the resulting polymer may not be controlled. On the other hand, the use of more than 20 g of the chain transfer agent may result in large amounts of impurities and therefore lead to low purity of the resulting polymer. Especially, when more than 20 g of a hydrogen sulfite is used, excess hydrogen sulfite is decomposed in the reaction system, which may disadvantageously result in generation of sulfur dioxide gas. In addition, the use of more than 20 g of the chain transfer agent may be disadvantageous in terms of cost.

A preferable combination of the initiator and the chain transfer agent is one or more of persulfates and one or more of hydrogen sulfites.

In this case, the blending ratio between the persulfate(s) and the hydrogen sulfite(s) is not particularly limited. Preferably, 0.5 to 5 parts by mass of the hydrogen sulfite(s) is/are used with respect to 1 part by mass of the persulfate(s). The lower limit of the amount of the hydrogen sulfite(s) is more preferably 1 part by mass, and is further more preferably 2 parts by mass with respect to 1 part by mass of the persulfate(s). The upper limit of the amount of the hydrogen sulfite(s) is more preferably 4 parts by mass, and further more preferably 3 parts by mass with respect to 1 part by mass of the persulfate(s). If less than 0.5 parts by mass of the hydrogen sulfite(s) is/are used with respect to 1 part by mass of the persulfate(s), the total initiator amount required to produce a lower-molecular weight polymer may increase. On the other hand, the use of more than 5 parts by mass of the hydrogen sulfite(s) may increase side reactions and therefore increase impurities produced in the side reactions.

The total amount of the chain transfer agent, the initiator, and the reaction accelerator is preferably 2 to 20 g per mol of all the monomers (A), (B), and (E). If these agents are used in an amount within this range, the carboxyl group-containing polymer of the present invention can be efficiently produced, and the molecular weight distribution of the polymer can be controlled within a desired range. The total amount of them is more preferably 4 to 18 g, and further more preferably 6 to 15 g.

In the preparation method, the monomers, the polymerization initiator, and the chain transfer agent may be added in a reaction vessel by continuous addition such as drop-wise addition and portion-wise addition. Each of them may be separately charged in the reaction vessel, or they may be mixed with other materials or in a solvent or the like in advance.

Specifically, these materials may be added by methods such as a method including charging all the monomers into the reaction vessel and adding the polymerization initiator to the reaction vessel to copolymerize the monomers; a method including charging a portion of the monomers into the reaction vessel, and adding the polymerization initiator and the remaining monomers continuously or portionwise (preferably, continuously) to the reaction vessel to copolymerize the monomers; and a method including charging a polymerization solvent into the reaction vessel, and adding all of the monomers and the polymerization initiator. Among these methods, the method including continuously adding the polymerization initiator and the monomers dropwise into the reaction vessel to copolymerize the monomers is preferable because it provides polymers having a narrow (sharp) molecular weight distribution and improves the dispersibility of soils and anti-soil redeposition ability. Polymerization may be batchwise polymerization or continuous polymerization.

<Polymerization Condition>

In the preparation method, the polymerization temperature is appropriately determined based on factors such as the polymerization method, the solvent, and the polymerization initiator. The polymerization temperature is preferably 25° C. to 200° C., more preferably 50° C. to 150*° C., furthermore preferably 60° C. to 120° C., and particularly preferably 80° C. to 110° C. At polymerization temperatures of lower than 25° C., the resulting polymer may have too high weight average molecular weight and larger amounts of impurities may be produced.

The polymerization temperature is not necessarily kept substantially constant throughout the polymerization reaction. For example, the temperature may be set at room temperature at the start of the polymerization, and increased to a target temperature at an appropriate temperature rising rate or over an appropriate temperature rising time, and then kept at the target temperature. Alternatively, the temperature may be altered (increased or decreased) with a lapse of time during the polymerization reaction depending on the method for the drop-wise addition of the monomers, the initiator, and the like. The term "polymerization temperature" used herein means the temperature of the react ion solution during the polymerization reaction. The method for measuring the polymerization temperature and means for controlling the polymerization temperature may be appropriately selected from any methods and controlling means. For example, the polymerization temperature can be measured with a common device.

The pressure during the polymerization in the preparation method is not particularly limited and can be suitably determined. For example, the pressure may be any of ambient pressure (atmospheric pressure), reduced pressure, and increased pressure. The atmosphere in the reaction system may be an air or inert gas atmosphere. In order to produce an inert gas atmosphere in the reaction system, the air in the system is replaced with an inert gas such as nitrogen before the start of the polymerization, for example. In this atmosphere, the atmospheric gas (such as oxygen gas) in the reaction system dissolves in the liquid phase and serves as a polymerization inhibitor.

In the preparation method, the solids content of the reaction solution (polymer solution) at the completion of addition of the monomers, the polymerization initiator and the chain transfer agent is preferably not less than 35% by mass. In the case that the solids content is less than 35% by mass, the productivity of the resulting polymer may not be strikingly improved. The solids content is more preferably 40 to 70% by mass, and further more preferably 45 to 65% by mass. When solids contents is not less than 35% by mass at the completion of addition of the monomers, the polymerization initiator and the chain transfer agent, the polymerization can be performed in one step in a high concentration reaction solution. Namely, the polymer can be effectively produced. In this case, steps such as a concentration step can be omitted, which in turn leads to remarkable improvement in the productivity of the polymer and suppresses an increase in the production cost.

The solids content can be calculated by sampling a portion of the reaction solution after completion of the drop-wise addition, and quantifying nonvolatile matters after one-hour treatment with a hot air dryer at 130° C.

In the preparation method, a maturing step may be performed to improve the polymerization rate of the monomers and the like after addition of all the raw materials. The maturing time is preferably 1 to 120 minutes, more preferably 5 to 60 minutes, and further more preferably 10 to 30 minutes. Maturing for less than one minute is insufficient such that portion of the monomers may remain. Consequently, impurities derived from the remaining monomers may deteriorate performance of the product. Maturing for more than 120 minutes may result in a colored polymer solution.

In the preparation method, the polymerization time is not particularly limited, and is preferably 30 to 420 minutes, more preferably 45 to 390 minutes, further more preferably 60 to 360 minutes, and still further more preferably 90 to 300 minutes. The term "polymerization time" used herein means a time in which the monomers are being added, that is, a time from the start to the end of addition of the monomers.

[Carboxyl Group-Containing Polymer Composition]

The carboxyl group-containing polymer composition of the present invention contains the carboxyl group-containing polymer. The carboxyl group-containing polymer has a weight average molecular weight of 23,000 to 50,000, and includes a structure unit (a) derived from an acrylic acid-based monomer (A) at a level of from 60 to 70% by mass and a structure unit (b) derived from a sulfonic acid group-containing monomer (B) at a level of from 30 to 40% by mass based on 100% by mass of all structure units derived from all monomers in the carboxyl group-containing polymer. The carboxyl group-containing polymer composition further contains an adduct of a hydrogen sulfite to the acrylic acid-based monomer (A), and the adduct is present at a level of 0.3 to 5% by mass based on 100% by mass of the solids content of the carboxyl group-containing polymer composition.

The adduct of a hydrogen sulfite to the acrylic acid-based monomer (A) (hereinafter, also referred to as "hydrogen sulfite adduct") is an impurity derived from the acrylic acid-based monomer (A) which remains unpolymerized although the above hydrogen sulfite and/or the compound capable of producing a hydrogen sulfite used as a chain transfer agent is added thereto. Specific examples thereof include 3-sulfopropionic acid (salts) and the like.

The level of the hydrogen sulfite adduct is, as described above, 0.3 to 5% by mass based on 100% by mass of the solids content of the carboxyl group-containing polymer composition. Due to the presence of the hydrogen sulfite adduct at a level in the above range, the detergency against muddy soils is improved. The level of the polymer is preferably 0.6 to 3% by mass, and more preferably 0.7 to 2% by mass.

The carboxyl group-containing polymer composition of the present invention may further contain other components other than the carboxyl group-containing polymer and the hydrogen sulfite adduct.

Examples of other components include, but are not limited to, residual polymerization initiator, residual monomers, by-products of the polymerization, and water. One or more of these components may be contained.

In terms of anti-soil redeposition ability, the carboxyl group-containing polymer composition of the present invention preferably contains 1 to 99.5% by mass of the carboxyl group-containing polymer based on 100% by mass of the carboxyl group-containing polymer composition. The level is more preferably 30 to 99% by mass, and still more preferably 40 to 98% by mass.

In one preferable modification, the carboxyl group-containing polymer composition contains 40 to 60% by mass of the carboxyl group-containing polymer and 35 to 59.5% by mass of water.

In terms of improvement in anti-soil redeposition ability of the carboxyl group-containing polymer composition of the present invention, the amount of the sulfonic acid group-containing monomer (B) remaining unreacted in the carboxyl group-containing polymer composition is preferably not more than 5000 ppm and more preferably not more than 2500 ppm based on the solids content of the carboxyl group-containing polymer composition.

[Usage of Carboxyl Group-Containing Polymer Composition]

The carboxyl group-containing polymer composition of the present invention can be used as a coagulant, flocculating agent, printing ink, adhesive, soil control (modification) agent, fire retardant, skin care agent, hair care agent, additive for shampoos, hair sprays, soaps, and cosmetics, anion exchange resin, dye mordant and auxiliary agent for fibers and photographic films, pigment dispersant for paper making, paper reinforcing agent, emulsifier, preservative, softening agent for textiles and paper, additive for lubricants, water treatment agent, fiber treating agent, dispersant, additive for detergents, detergent builder, detergent composition, detergent, scale control agent (scale depressant), metal ion binding agent, viscosity improver, binder of any type, emulsifier, and the like.

The carboxyl group-containing polymer composition of the present invention has high performance when used in aqueous environment. In addition, the polymer composition has high hard water resistance, detergency, anti-soil redeposition ability, clay dispersibility, and interaction with surfactants and therefore exhibits better performance when used in water treatment agents, dispersants, detergent builders, detergent compositions, and detergents.

<Water Treatment Agent>

The carboxyl group-containing polymer composition of the present invention can be used in water treatment agents. In these water treatment agents, other additives such as polyphosphates, phosphonates, anti-corrosion agents, slime control agents, and chelating agents may be added, if necessary.

Such water treatment agents are useful for scale inhibition of cooling water circulation systems, boiler water circulation systems, seawater desalination plants, pulp digesters, black liquor condensing kettles and the like. In addition, any suitable water soluble polymer may be included within a range of not affecting the performance or effect of this composition.

<Further Treating Agent>

The carboxyl group-containing polymer composition of the present invention can be used in fiber treating agents. Such fiber treating agents contain at least one selected from the group consisting of dyeing agents, peroxides, and surfactants, in addition to the carboxyl group-containing polymer composition of the present invention.

In these fiber treating agents, the carboxyl group-containing polymer composition of the present invention preferably constitutes 1 to 100% by mass, and more preferably 5 to 100% by mass of the total amount. In addition, any suitable water soluble polymer may be included within a range of not affecting the performance or effect of this composition.

An example of the amounts of components in these fiber treating agents is described below. The fiber treating agents can be used in steps of scouring, dyeing, bleaching and soaping in fiber treatment. Examples of dyeing agents, peroxides, and surfactants include those commonly used in fiber treating agents.

Regarding the blending ratio (in solid content) between the carboxyl group-containing polymer composition of the present invention and at least one selected from the group consisting of dyeing agents, peroxides, and surfactants, for example, a composition that contains at least one selected from the group consisting of dyeing agents, peroxides, and surfactants at a level of 0.1 to 100 parts by mass per part by mass of the composition of the present invention is preferable as a fiber treatment agent in terms of improvement in whiteness, color uniformity; and dyeing fastness of fibers.

Such a fiber treating agent can be used for any suitable fibers including cellulosic fibers such as cotton and hemp, synthetic fibers such as nylon and polyester, animal fibers such as wool and silk thread, semisynthetic fibers such as rayon, and textiles and mixed products of these.

For a fiber treating agent used in a scouring step, an alkali agent and a surfactant are preferably used together with the composition of the present invention. For a fiber treating agent used in a bleaching step, a peroxide and a silicic acid-based agent (e.g. sodium silicate) which serves as a decomposition inhibitor for alkaline bleaches are preferably used with the composition of the present invention.

<Inorganic Pigment Dispersant>

The carboxyl group-containing polymer composition of the present invention can be used in inorganic pigment dispersants. In these inorganic pigment dispersants, other additives such as condensed phosphoric acid and salts thereof, phosphonic acid and salts thereof, and polyvinyl alcohol may be added, if necessary.

In these inorganic pigment dispersants, the carboxyl group-containing polymer composition of the present invention preferably constitutes 5 to 100% by mass of the total amount. In addition, any suitable water soluble polymer may be included within a range of not affecting the performance or effect of this composition.

These inorganic pigment dispersants exhibit good performance as inorganic pigment dispersants for heavy or light calcium carbonate and clay used for paper coating. For example, by adding such an inorganic pigment dispersing agent in a small amount to inorganic pigments and dispersing them in water, a highly concentrated inorganic pigment slurry such as a highly concentrated calcium carbonate slurry having low viscosity, high fluidity, and excellent temporal stability of these properties can be produced.

When such an inorganic pigment dispersant is used as a dispersant for inorganic pigments, the amount of the inorganic pigment dispersant is preferably 0.05 to 2.0 parts by mass per 100 parts by mass of inorganic pigments. The use of the inorganic pigment dispersant in an amount within this range provides a sufficient dispersion effect proportional to the added amount and is advantageous in terms of cost.

<Detergent Builder>

The carboxyl group-containing polymer composition of the present invention can be also used as a detergent builder. The detergent builder can be added to detergents for various usages such as detergents for clothes, tableware, cleaning, hair, bodies, toothbrushing, and vehicles.

<Detergent Composition>

The carboxyl group-containing polymer composition of the present invention can also be used in detergent compositions.

In the detergent compositions, the amount of the carboxyl group-containing polymer composition is not particularly limited, and the carboxyl group-containing polymer composition is preferably present at a level of 0.1 to 15% by mass, more preferably 0.3 to 10% by mass, and further more preferably 0.5 to 5% by mass based on the total amount (100% by mass) to provide excellent detergent builder performance.

If intended for use in fabric washing, the detergent compositions typically contain surfactants and additives which are commonly used in detergents. Such surfactants and additives are not particularly limited and are appropriately selected based on common knowledge in the detergent industry. The detergent compositions may be powder detergent compositions or liquid detergent compositions.

One or more surfactants selected from the group consisting of anionic surfactants, nonironic surfactants, cationic surfactants, and amphoteric surfactants are used. When two or more of them are used in combination, the total amount of anionic surfactant(s) and nonionic surfactant(s) is preferably not less than 50% by mass, more preferably not less than 60% by mass, further more preferably not less than 70% by mass, and particularly preferably not less than 80% by mass based on the total amount (100% by mass) of all the surfactants.

Suitable examples of anionic surfactants include alkylbenzene sulfonates, alkylether sulfates, alkenylether sulfates, alkyl sulfates, alkenyl sulfates, $\alpha$-olefinsulfonates, $\alpha$-sulfo fatty acids and esters of these, alkane sulfonates, saturated fatty acid salts, unsaturated fatty acid salts, alkylether carboxylates, alkenylether carborylates, amino acid-type surfactants, N-acylamino acid-type surfactants, alkyl phosphates and salts of these, and alkenyl phosphates and salts of these.

The alkyl groups or alkenyl groups in these anionic surfactants may be linear or branched.

Suitable examples of nonionic surfactants include polyoxyalkylene alkyl ethers, polyoxyalkylene alkenyl ethers, polyoxyethylene alkyl phenyl ethers, higher-fatty-acid alkanol amides and alkylate oxide adducts thereof, sucrose fatty acid esters, alkyl glycoxydes, fatty acid glycerin monoesters, and alkylamine oxides. The alkyl groups or the alkenyl groups in these nonionic surfactants may be linear or branched.

Suitable examples of cationic surfactants include quarternary ammonium, salts. Suitable examples of amphoteric surfactants include carboryl-type amphoteric surfactants, and sulfobetaine-type amphoteric surfactants. The alkyl groups or the alkenyl groups in these cationic and amphoteric surfactants may be linear or branched.

In these detergent compositions, those surfactants are typically present at a level of 10 to 60% by mass based on the total amount (100% by mass), and are preferably present at a level of 15 to 50% by mass, more preferably at a level of 20 to 45% by mass, and further more preferably at a level of 25 to 40% by mass. The use of surfactants at a level of less than 10% by mass may result in insufficient detergency. On the other hand, the use of surfactants at a level of more than 60% by mass is disadvantageous in terms of cost.

Suitable examples of additives include stain inhibitors (e.g. benzotriazole, ethylene thiourea), soil release agents, color migration inhibitors, softening agents, alkaline substances for pH adjustment, perfumes, solubilizing agents, fluorescent agents, coloring agents, foaming agents, foam stabilizers, lustering agents, bactericides, bleaching agents, bleaching assistants, enzymes (e.g. proteases, lipases, cellulases), dyes, and solvents. Powder detergent compositions preferably contain zeolite.

These detergent compositions may contain other detergent builders in addition to the carboxyl group-containing polymer composition of the present invention. Examples of other detergent builders include, but are not particularly limited to, alkali builders such as carbonates, hydrogen carbonates, silicates, and sulfates; chelate builders such as tripolyphosphoric acid salts, pyrophosphoric acid salts, Glauber's salt, nitrilotriacetic acid salts, ethylenediaminetetraacetic acid salts, diethylenetriaminepentaacetic acid salts, citric acid salts, diglycolic acid salts, oxycarboxylic acid salts, salts of (meth) acrylic acid copolymers, acrylic acid-maleic acid copolymers, fumaric acid salts, and zeolite; and carboxyl derivatives of polysaccharides such as carboxymethyl cellulose. Examples of counter salts used with these builders include alkali metals such as sodium and potassium, ammonium, and amines.

In the detergent compositions, the above additives and other detergent builders are preferably present at a total level of 0.1 to 50% by mass based on the total amount (100% by mass). The level is more preferably 0.2 to 40% by mass, further more preferably 0.3 to 35% by mass, still further more preferably 0.4 to 30% by mass, and particularly preferably 0.5 to 20% by mass. The use of the additives and other detergent builders at a total level of less than 0.1% by mass may result in insufficient detergency, and the use of the additives and other detergent builders at a total level of more than 50% by mass is disadvantageous in terms of cost.

It should be understood that the concept of the "detergent compositions" includes detergents used only for specific usages such as bleaching detergents which have improved performance delivered by one component therein, in addition to synthetic detergents of household detergents, detergents for industrial use (e.g. detergents used in the textile industry), and hard surface detergents.

In the case of a liquid detergent composition, the water content of the liquid detergent composition is preferably 0.1 to 75% by mass, more preferably 0.2 to 70% by mass, further more preferably 0.5 to 65% by mass, still more preferably 0.7 to 60% by mass, still further more preferably 1 to 55% by mass, and particularly preferably 1.5 to 50% by mass of the total amount of the detergent composition.

In the case of a liquid detergent composition, the kaolin turbidity of the detergent composition is preferably not more than 200 mg/L, more preferably not more than 150 mg/L, further more preferably not more than 120 mg/L, still further more preferably not more than 100 mg/L, and particularly preferably not more than 50 mg/L.

The kaolin turbidity can be measured as follows. A uniformly stirred sample (liquid detergent) is charged in a 50 mm-square cell with a thickness of 10 mm, and bubbles are removed therefrom. Then, the sample is measured for turbidity (kaolin turbidity; mg/L) at 25° C. with a turbidimeter (trade name: NDH2000, product of Nihon Denshoku Industries Co., Ltd.).

These detergent compositions have high dispersibility and are less likely to show performance deterioration even after stored for a long time, or to generate precipitation of impurities even after stored at a low temperature. Therefore, the use of these detergent compositions provides detergents with strikingly high performance and stability.

Advantageous Effects of Invention

The carboxyl group-containing polymer composition of the present invention is designed as described above and exhibits high anti-soil redeposition ability in fabric washing. Due to this performance, the carboxyl group-containing polymer composition of the present invention can be suitably used as a raw material for detergent additives and the like.

DESCRIPTION OF EMBODIMENTS

The following description is offered to describe the present invention by way of Examples. The present invention, however, is not limited only to these examples. All parts are by mass unless otherwise specified, and all percentages are by mass unless otherwise specified.

The monomers and reaction intermediates were quantified and measured for physical properties by the methods described below.

<Measurement Condition of Weight Average Molecular Weight (GPC)>

Measuring device: L-7000 series (product of Hitachi Ltd.)
Detector; HITACHI RI Detector, L-7490
Column: SHODEX Asahipak GF-310-HQ, GF-710-HQ, GF-1G 7B (products of Showa Denko K. K.)
Column temperature; 40° C.
Flow velocity: 0.5 ml/min
Calibration, curve: Polyacrylic acid standard (Product of Sowakagaku Co., Ltd)
Eluent: 0.1 N sodium acetate/acetonitrile=3/1 (mass ratio)

<Quantification of Acrylic Acid-Based Monomer, Sulfonic Acid Group-Containing Monomer, and Hydrogen Sulfite Adduct>

The acrylic acid-based monomer, the sulfonic acid group-containing monomer, and the hydrogen sulfite adduct were quantified by liquid chromatography under the following conditions.

Measuring device; L-7000 series (product of Hitachi Ltd.)
Detector: UV detector, L-7400 (product of Hitachi Ltd.)
Column: SHODEX RSpak DE-413 (product of Showa Denko K. K.)
Temperature: 40° C.
Eluent: 0.1% phosphoric acid aqueous solution
Flow velocity: 1.0 ml/min
<Measurement of Solids Content>
A mixture of 1.0 g of a carboxyl group-containing polymer composition of the present invention and 1.0 g of water was left in an oven heated to 130° C. in nitrogen atmosphere for one hour so as to be dried. The solids content (%) and volatile component content (%) were calculated from the mass change before and after the drying step.

Example 1

In a 1000-ml glass separable flask equipped with a reflux condenser and a stirrer (paddle blade), pure water (29.7 g) and Mohr's salt (0.0117 g) were stirred while heating to 85° C. Thus, a polymerization reaction system was built. Next, an 80% acrylic acid aqueous solution (hereinafter, also referred to as 80% AA) (162.0 g), a 40% aqueous solution of sodium 3-allyloxy-2-hydroxypropanesulfonate (hereinafter, also referred to as 40% HAPS) (174.5 g), a 15% sodium persulfate aqueous solution (hereinafter, also referred to as 15% NaPS) (42.4 g), and a 35% sodium hydrogen sulfite aqueous solution (hereinafter, also referred to as 35% SBS) (18.2 g) were separately added dropwise through different nozzles to the polymerization reaction system maintained at 35° C., with stirring. The drop-wise addition times of 80% AA, 40% HAPS, 15% NaPS, and 35% SBS were 180 minutes, 120 minutes, 190 minutes, and 175 minutes, respectively. The drop-wise addition of each solution was continuously performed at a constant rate.

The resulting solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding dropwise a 48% sodium hydroxide aqueous solution (hereinafter, also referred, to as 48% NaOH) (127.5 g).

Through these steps, a polymer aqueous solution (1) containing a polymer (1) of the present invention was prepared. The solids content of the polymer aqueous solution (1) was 45%, the weight average molecular weight of the polymer (1) was 30,000; and the HAPS content of the polymer aqueous solution (1) was 2000 ppm based on the solids content of the polymer aqueous solution (1).

Example 2

In a 2000-mL glass separable flask equipped with a reflux condenser and a stirrer (paddle blade), pure water (92.1 g) and Mohr's salt (0.0310 g) were stirred while heating to 85° C. Thus, a polymerization reaction system was built. Next, 80% AA (450.0 g), 40% HAPS (429.2 g), 15% NaPS (115.8 g), and 35% SBS (23.2 g) were separately added dropwise through different nozzles to the polymerization reaction system maintained at 85° C., with stirring. The drop-wise addition times of 80% AA, 40% HAPS, 15% NaPS, and 35% SBS were 180 minutes, 120 minutes, 190 minutes, and 175 minutes, respectively. The drop-wise addition of each solution was continuously performed at a constant rate.

The resulting solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding dropwise 48% NaOH (350.6 g).

Through these steps, a polymer aqueous solution (2) containing a polymer (2) of the present invention was prepared. The solids content of the polymer aqueous solution (2) was 45%; the weight average molecular weight of the polymer (2) was 39,000; and the HAPS content of the polymer aqueous solution (2) was 600 ppm based on the solids content of the polymer aqueous solution (2).

Example 3

In a 2000-mL glass separable flask equipped with a reflux condenser and a stirrer (paddle blade), pure water (29.1 g) and Mohr's salt (0.017 g) were stirred while heating to 85° C. Thus, a polymerization reaction system was built. Next, 80% AA, (162.0 g), 40% HAPS (174.5 g), 15% NaPS (42.4 g), and 35% SBS (21.2 g) were separately added dropwise through different nozzles to the polymerization reaction system maintained at 85° C., with stirring. The drop-wise addition times of 80% AA, 40% HAPS, 15% NaPS, and 35% SBS were 180 minutes, 120 minutes, 190 minutes, and 175 minutes, respectively. The drop-wise addition of each solution was continuously performed at a constant rate.

The resulting solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding dropwise 48% NaOH (127.5 g).

Through these steps, a polymer aqueous solution (3) containing a polymer (3) of the present invention was prepared. The solids content of the polymer aqueous solution (3) was 45%; and the weight average molecular weight of the polymer (3) was 23,000; and the HAPS content of the polymer aqueous solution (3) was 1800 ppm based on the solids content of the polymer aqueous solution (3).

Comparative Example 1

In a 1000-mL glass separable flask equipped with a reflux condenser and a stirrer (paddle blade), pure water (31.0 g) and Mohr's salt (0.0120 g) were stirred while heating to 85° C. Thus, a polymerization reaction system was built. Next, 80% AA (162.0 g), 40% HAPS (174.5 g), 15% NaPS (42.4 g), and 35% SBS (30.3 g) were separately added dropwise through different nozzles to the polymerization reaction system maintained at 85° C., with stirring. The drop-wise addition times of 80% AA, 40% HAPS, 15% NaPS, and 35% SBS were 180 minutes, 150 minutes, 190 minutes, and 175 minutes, respectively. The drop-wise addition of each solution was continuously performed at a constant rate.

The resulting solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding dropwise 48% NaOH (127.5 g).

Through these steps, a comparative polymer aqueous solution (1) containing a comparative polymer (1) was prepared. The solids content of the comparative polymer aqueous solution (1) was 45%; and the weight average molecular weight of the comparative polymer (1) was 12,000.

Comparative Example 2

In a 2000-mL glass separable flask equipped with a reflux condenser and a stirrer (paddle blade), pure water (165.1 g)

and Mohr's salt (0.0259 g) were stirred while heating to 85° C. Thus, a polymerization reaction system was built. Next, 80% AA (450.0 g), 40% HAPS (111.3 g), 15% NaPS (104.1 g), and 35% SBS (14.9 g) were separately added dropwise through different nozzles to the polymerization reaction system maintained at 85° C., with stirring. The drop-wise addition times of 80% AA, 40% HAPS, 15% NaPS, and 35% SBS were 180 minutes, 150 minutes, 190 minutes, and 175 minutes, respectively. The drop-wise addition of each solution was continuously performed at a constant rate.

The resulting solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding dropwise 48% NaOH (386.4 g).

Through these steps, a comparative polymer aqueous solution (2) containing a comparative polymer (2) was prepared. The solids content of the comparative polymer aqueous solution (2) was 45%; and the weight average molecular weight of the comparative polymer (2) was 40,000.

Comparative Example 3

In a 1000-mL glass separable flask equipped with a reflux condenser and a stirrer (paddle blade), pure water (79.6 g) and 40% HAPS (132.6 g) were stirred while heating to the boiling point. Thus, a polymerization reaction system was built. Next, 80% AA (198.0 g), 48% NaOH (142.6 g), 15% NaPS (48.9 g), and 35% hydrogen peroxide (hereinafter, also referred to as 35% $H_2O_2$) (34.9 g) were separately added dropwise through different nozzles to the polymerization reaction system maintained at the boiling point, with stirring. The drop-wise addition time of 80% AA was 180 minutes; the drop-wise addition time of 48% NaOH was 165 minutes after 15 minutes from the start of drop-wise addition of 80% AA; the drop-wise addition time of 15% NaPS was 190 minutes; and the drop-wise addition time of 35% $H_2O_2$ was 140 minutes after 10 minutes from the start of drop-wise addition of 80% AA. The drop-wise addition of each solution was continuously performed at a constant rate.

The resulting solution was maintained (matured) at the boiling point for 30 minutes after the completion of drop-wise addition of 80% AA. In this manner, polymerization was completed. After the completion of polymerization, the reaction solution was cooled with stirring, and then neutralized by gradually adding dropwise 48% NaOH (10.2 g).

Through these steps, a comparative polymer aqueous solution (3) containing a comparative polymer (3) was prepared. The solids content of the comparative polymer aqueous solution (3) was 45%; and the weight average molecular weight of the comparative polymer (3) was 20,000.

<Anti-Soil Redeposition Ability Test/Carbon Black>

An anti-soil redeposition ability test was performed with carbon black in the following procedure.

(1) Cotton cloth available from Testfabrics Inc. was cut into 5 cm×5 cm white cloth samples. The degree of whiteness was determined for the white cloth samples by measuring the reflectance with a colorimetric color difference meter (SE2000, product of Nippon Denshoku Industries Co., Ltd.).

(2) Pure water was added to calcium chloride dihydrate (8.82 g) such that hard water (20 kg) was prepared.

(3) A mixture (90.0 g) was prepared by adding pure water to sodium dodecylbenzensulfonate (4 g), sodium hydrogen carbonate (4.75 g), and sodium sulfate (4 g) and adjusted to pH 10 with a sodium hydroxide aqueous solution. Pure water was further added thereto such that a surfactant aqueous solution (100.0 g in total) was prepared.

(4) A tergotmeter was set at 25° C. The hard water (1 L), the surfactant aqueous solution (2.5 g), a 0.4% (cased on the solids content) polymer aqueous solution (2.5 g), zeolite (0.075 g), and carbon black (0.05 g) were stirred for one minute in a pot at 100 rpm. Subsequently, seven white cloth samples were put into the mixture, and the mixture was stirred for ten minutes at 100 rpm.

(5) The white cloth samples were wrung by hand, and hard water (1 L) at 25° C. was poured into the pot and stirred at 100 rpm for two minutes.

(6) The white cloth samples were each covered with a piece of cloth and dried by ironing while wrinkles were smoothed. The cloth samples were measured again for reflectance as whiteness with the colorimetric difference meter.

(7) The anti-soil redeposition ratio was determined from the following equation, based on the measurement results.

Anti-soil redeposition ratio (%)=(whiteness of white cloth after washed)/(initial whiteness of white cloth)>100

The mass ratios between the structure units (a) and (b) in the polymers, the weight average molecular weights of the polymers, the 3-sulfopropionic acid (3SPA) contents, and the anti-soil redeposition ability of the compositions prepared in Examples and Comparative Examples are shown in Table 1.

TABLE 1

| | Structure units (a)/(b) (% by mass) | Weight average molecular weight | 3SPA (ppm) | Anti-soil redeposition ability |
|---|---|---|---|---|
| Example 1 | 68/32 | 30,000 | 15,000 | 38.6 |
| Example 2 | 70/30 | 39,000 | 4,000 | 37.5 |
| Example 3 | 68/32 | 23,000 | 12,000 | 39.4 |
| Comparative Example 1 | 68/32 | 12,000 | 20,000 | 35.5 |
| Comparative Example 2 | 90/10 | 40,000 | 300 | 35.9 |
| Comparative Example 3 | 77/23 | 20,000 | 0 | 33.5 |

The results of Examples and Comparative Examples demonstrate that the carboxyl group-containing polymer compositions of the present invention which contain a carboxyl group-containing polymer including a structure unit (a) derived from an acrylic acid-based monomer (A) and a structure unit (b) derived from a sulfonic acid group-containing monomer (B) at specific levels, and having a specific weight average molecular weight, and further contain a specific amount of an adduct of a hydrogen sulfite to the acrylic acid-based monomer (A) have good anti-soil redeposition ability in hard water environment.

Thus, it is presumed that the same mechanism of sufficiently producing good anti-soil redeposition ability works when any of the compositions of the present invention having the above specific constitution.

Therefore, it should be understood from the results of Examples, the present invention can be applied in the entire technical field of the present invention and in the various modifications disclosed herein, and produce advantageous effects.

The invention claimed is:

1. A carboxyl group-containing polymer composition comprising a carboxyl group-containing polymer,
   wherein the carboxyl group-containing polymer consists of a structure unit (a) derived from an acrylic acid-based monomer (A) at a level of from 62 to 70% by mass and a structure unit (b) derived from a sulfonic acid group-containing monomer (B) at a level of from 30 to 38% by mass based on 100% by mass of all structure units derived from all monomers in the carboxyl group-containing polymer, the carboxyl group-containing polymer has a weight average molecular weight of 23,000 to 50,000, and wherein the carboxyl group-containing polymer composition further comprises an adduct of a hydrogen sulfite to the acrylic acid-based monomer (A), and the adduct is present at a level of 0.3 to 5% by mass based on 100% by mass of a solids content of the carboxyl group-containing polymer composition.

2. The carboxyl group-containing polymer composition according to claim 1, wherein the structure unit (a) is at a level of from 64 to 70% by mass and a structure unit (b) is at a level of from 30 to 36% by mass based on 100% by mass of all structure units derived from all monomers in the carboxyl group-containing polymer.

3. The carboxyl group-containing polymer composition according to claim 1, wherein the structure unit (a) is at a level of from 66 to 70% by mass and a structure unit (b) is at a level of from 30 to 34% by mass based on 100% by mass of all structure units derived from all monomers in the carboxyl group-containing polymer.

4. The carboxyl group-containing polymer composition according to claim 1, wherein the carboxyl group-containing polymer has a weight average molecular weight of 23,000 to 45,000.

5. The carboxyl group-containing polymer composition according to claim 1, wherein the carboxyl group-containing polymer has a weight average molecular weight of 24,000 to 40,000.

6. The carboxyl group-containing polymer composition according to claim 1, wherein the carboxyl group-containing polymer has a weight average molecular weight of 25,000 to 38,000.

7. The carboxyl group-containing polymer composition according to claim 1, wherein the carboxyl group-containing polymer has a weight average molecular weight of 27,000 to 33,000.

* * * * *

UNITED STATES PATENT AND TRADEMARK OFFICE
CERTIFICATE OF CORRECTION

PATENT NO. : 8,809,474 B2  
APPLICATION NO. : 13/600312  
DATED : August 19, 2014  
INVENTOR(S) : Atsuro Yoneda et al.

Page 1 of 1

It is certified that error appears in the above-identified patent and that said Letters Patent is hereby corrected as shown below:

In the Claims

Column 25, claim 1, line 9, delete "further".

Signed and Sealed this  
Ninth Day of December, 2014

Michelle K. Lee  
*Deputy Director of the United States Patent and Trademark Office*